Patented Oct. 21, 1952

2,614,941

UNITED STATES PATENT OFFICE 2,614,941

STABILIZED LOWER FATTY ACID ESTER OF CELLULOSE

Gordon D. Hiatt and Robert F. Williams, Rochester, N. Y., assignors to Eastman Kodak Company, Rochester, N. Y., a corporation of New Jersey No Drawing. Application November 15, 1949, Serial No. 127,516

11 Claims. (Cl. 106—183)

This invention relates to stabilized cellulose esters from the effect of residual sulfur by incorporating therein a small proportion of a formate of aluminum, barium, tin or magnesium.

Cellulose organic acid esters are ordinarily prepared by reacting upon cellulose with acetic or other fatty acid anhydride and sulfuric acid as the catalyst. As a consequence, the resulting esters which are obtained have a small proportion of combined sulfur therein which upon heating of the ester will cause discoloration and a decided decrease of the intrinsic viscosity thereof. The stabilizing of cellulose esters to overcome the effects of the combined sulfur has resulted in the addition of various materials to the cellulose esters, such as salts of various metals. The degree of stability in cellulose esters which can be achieved by adding salts is limited, however, by several factors such as (1) the readiness of the salt to disperse in the ester, (2) the color stability of the ester at high temperature when an excess of active alkaline ion is present and (3) the effect of the acid radical of the stabilizing salt. As a consequence, it has been often necessary heretofore to determine the proportion of sulfur present in each individual batch of cellulose ester and to add the proportion of stabilizing salt thereto which will not result in an excess of active alkaline ion therein. Also, the use of some salts for stabilizing has not been desirable because of the difficulty of obtaining uniform distribution thereof in the cellulose ester.

One object of our invention is to provide stabilized cellulose organic acid esters in which the stabilizer admits of uniform distribution therein. Another object of our invention is to provide stabilized cellulose esters in which the amount of stabilizer added is not particularly critical within limits. A further object of our invention is to provide stabilizers for cellulose esters, the anions of which when heated do not form stable acids or anhydrides. Other objects of our invention appear herein.

We have found that the formates of aluminum, magnesium, tin, and barium are eminently suited for use as stabilizers for cellulose esters which includes both the normal and the basic salts thereof. We have found that these salts are free of the objections which have previously been associated with salts useful for stabilizing purposes in that these formates exhibit wide solubilities, the cations thereof are not strongly alkaline, and, hence, an excess of stabilizer is not objectionable, and the anions thereof do not exhibit any detrimental effect on the cellulose ester.

Our invention relates to stabilized cellulose organic acid esters, such as cellulose acetate, cellulose acetate propionate, or cellulose acetate butyrate having a small proportion of residual combined sulfur therein, such as within the range of .02–.001%. Some of the cellulose acetates which may be stabilized by our invention are those having an acetyl content of 38.5–42% or those cellulose acetates ordinarily regarded as triacetates and having an acetyl content of 42–44.5%. However, any of the cellulose acetates may be stabilized in accordance with our invention. The butyric acid esters of cellulose which may be stabilized in accordance with our invention are either the simple esters or the acetate butyrates, both those having a high butyryl content, such as 35–55% butyryl, and those esters having a lower butyryl content, particularly those having a butyryl content of 12–20%. Also, in the case of the propionic acid esters of cellulose stabilization in accordance with our invention may be either of the simple or mixed esters and includes both those of high and low propionyl content.

An advantage of the use of the formates of aluminum, magnesium, tin or barium in the stabilizing of cellulose esters is that a fair charge of that material can be added to the cellulose ester without any danger of discloration occurring. If the proportion added is more than is needed to combine with the sulfate radicals which are present, the excess may not cause discoloration of the ester. If, on the other hand, the amount added is just the proportion needed or even less than the most effective proportion to employ, a stabilizing effect on the ester is nevertheless obtained. It is apparent that it is desirable to employ proportions of stabilizing salt in the upper portions of the range given with the cellulose esters having sulfur contents in the upper portion of the range given. The fact that an excess of stabilizer can be used distinguishes our invention from the stabilizing of cellulose esters with most other materials recognized as stabilizers against sulfur in that in most cases any excess of stabilizer has a tendency to promote discoloration of the cellulose ester. We have found that for the sulfur content specified, the proportion of formate of aluminum, magnesium, tin or barium to incorporate in the ester is 0.01–.5% and preferably .01–.2%, the latter being preferred due to the well-known effect which is produced by larger proportions of inorganic materials in cellulose esters, particularly an increase of haze as the proportion of inorganic materials in the ester is increased above certain limits. If, however, good clarity is not of particular importance, proportions of these formates above .5% may be useful in preparing cellulose esters stabilized therewith.

Any acidic effects from other ingredients which may be added to the cellulose ester such as from the impurities in plasticizers or solvents used may be inhibited by the addition of formates in accordance with our invention.

The stabilizing salts in accordance with our invention may be added by any suitable method which uniformly incorporates the salts in the cellulose ester. As our stabilizers are water-soluble, they may be incorporated in the cellulose ester by dissolving in the water employed for the final wash of the ester, the stabilizing salt being left on the ester, in fibrous form, in the form of the residual moisture resulting from the washing operation. Instead, the cellulose ester may be sprayed with a small amount of an aqueous solution of the stabilizing salt while it is present in the drier so that when the moisture is removed from the cellulose ester, there is uniformly distributed therethrough a small proportion of the stabilizing salt. Another means by which the stabilizing salt may be incorporated in the cellulose ester is by adding the stabilizer in aqueous solution to the cellulose ester when it is being worked up with plasticizer on hot rolls, such as in preparing molding or other plastic compositions therefrom. By working the material on hot rolls the moisture is evaporated, the cellulose ester material is fluxed, and there results a product in which uniform distribution of the stabilizing salt in the cellulose ester is obtained.

The following table shows the stabilizing effect upon cellulose esters by the incorporation of aluminum formate therein. These tests were run using cellulose acetate butyrate having a butyryl content of approximately 38% which had been treated with water containing aluminum formate so as to incorporate the desired proportion in the cellulose ester and then dried. The dry cellullose ester was worked on rolls in the proportion of 100 parts of ester to 5 parts of dibutyl sebacate until a homogeneous mass is obtained. Instead of dibutyl sebacate, other plasticizers may be employed such as dioctyl phthalate, methyl Cellosolve palmitate, dibutyl phthalate or 2-ethyl hexyl adipate. The results which were obtained were as follows:

| Grams of Aluminum Formate per 100 Grams of Ester | Color After 1 hr. at 205° C. | Percent of Intrinsic Viscosity lost during heating for 2 hrs. at 205° C. |
|---|---|---|
| 0 | 450 | 53 |
| .025 | 300 | 26 |
| .075 | 250 | 14 |
| 0.15 | 250 | 14 |
| 0.25 | 250 | 14 |
| 0.5 | 300 | 11 |

The color as specified in the above table and all other tests referred to herein was determined by comparing the resulting product for color with a stock solution made up as follows:

.20 g. Ciba oil soluble Yellow BB
.20 g. Calcofast Spirit Orange R
.002 g. General Dyestuffs Alizarine Cyanine Green G Ex. Conc. Color Index 1078

The dark brown solution thus obtained is further diluted with dimethyl phthalate so that a 1:20 solution is regarded as having a color of 500, a 1:50 solution as having a color of 180, and a 1:70 solution as having a color of 150.

The intrinsic viscosity measurements are indicative of the degree of general breakdown. A cellulose ester composition should not be degraded much below a value of 1.0 in these tests to still be useful for plastic purposes. The intrinsic viscosity is determined by measuring the flow rate of a solution of 0.25 g. of the test composition made up to 100 cc. with glacial acetic acid. A measure of the flow time itself gives the relative viscosity.

$$\text{Relative viscosity } (n)_r = \frac{\text{flow time for solution}}{\text{flow time for solvent}}$$

Intrinsic viscosity $(n) = 9.21 \log (n)_r$

The preparation of cellulose esters having low sulfur content is described in an article by Malm, Tanghe, and Laird in Industrial and Engineering Chemistry, vol. 38, page 77, January 1946. This disclosure is to be considered as part of the specification. The preparations described in that article were carried out on a laboratory scale and on a larger scale the water may be added during the hydrolysis at a more rapid rate providing the stirring uniformly distributes the water through the esterification mass and, yet, the combined sulfur in the cellulose ester is kept at a minimum.

A test similar to the preceding one was run using barium formate as the stabilizing salt. The results obtained in that test were as follows:

| Grams of Barium Formate per 100 Grams of Ester | Color After 1 hr. at 205° C. | Percent of Intrinsic Viscosity lost during heating for 2 hrs. at 205° C. |
|---|---|---|
| 0 | 450 | 53 |
| .05 | 250 | 10 |
| .10 | 300 | 10 |
| .15 | 400 | 9 |

Also, magnesium formate was employed for stabilizing cellulose acetate butyrate as described. The results of that test are as follows:

| Grams of Magnesium Formate per 100 Grams of Ester | Color After 1 hr. at 205° C. | Percent of Intrinsic Viscosity lost during heating for 2 hrs. at 205° C. |
|---|---|---|
| 0 | 450 | 53 |
| .05 | 250 | 14 |
| .10 | 300 | 11 |
| .15 | 350 | 10 |

In order to show the effectiveness as regards color in the use of aluminum formate for stabilizing cellulose esters as compared with other aluminum salts a comparative test was run using in one case aluminum acetate and in another case aluminum formate. The results obtained were as follows:

| | Color After 1 hr. at 205° C. | | | Intrinsic Viscosity after 2 hours at 205° C. | | |
|---|---|---|---|---|---|---|
| Weight percent of stabilizer based on ester | .05 | .1 | .15 | .05 | .1 | .15 |
| Aluminum acetate | 350 | 450 | Amber | .96 | .96 | 1.05 |
| Aluminum formate | 250 | 250 | 250 | 1.08 | 1.18 | 1.32 |

In the case of testing cellulose acetate in accordance with our invention it is desirable to employ approximately 25 parts of added plasticizer per 100 parts of cellulose acetate, the plasticizers which appear to be most useful in this case being diethyl or dimethyl phthalate and tripropionin.

Our invention applies to cellulose esters of fatty acids of 2-4 carbon atoms, either simple or mixed. Some of the esters are hydrolyzed such as to introduce .1-.5 hydroxyl groups per $C_6$ unit of cellulose. Other of the esters are slightly hydrolyzed so that the hydroxyl thereon is not appreciable. In the case of the cellulose acetates the esterifying liquid is made up primarily of acetic anhydride, acetic acid and sulfuric acid catalyst. In the case of cellulose acetate butyrate the esterifying liquid may be made up either of butyric anhydride, acetic acid, and sulfuric acid catalyst or of acetic anhydride, butyric acid, and sulfuric acid catalyst depending on whether a high or low butyryl ester is desired. The proportion of catalyst employed in the esterification may be from 1.5 to 10% of sulfuric acid based on the dry weight of the cellulose. Ordinarily, to obtain esters of good viscosity the esterification temperature is not allowed to rise above 100° F. although the esterification temperatures employed depend somewhat upon the amount of sulfuric acid catalyst used, the more catalyst present in the esterification mass, the more important it becomes that the temperature of the reaction mass be carefully controlled. In order to terminate the esterification, water, ordinarily in the form of aqueous acetic acid, is added to the reaction mass in a sufficient proportion to convert the residual acetic anhydride to acetic acid. Also added to the mass either in this addition or in the aqueous acid which may be added to initiate the hydrolysis is a neutralizing agent which combines with a considerable proportion of the sulfuric acid to form a salt which is insoluble in the reaction mixture. Magnesia or magnesium compounds of weak acids i. e. magnesium carbonate have been found to be especially useful for this purpose as the magnesium sulfate formed is insoluble in the reaction mass. Where a substantially fully esterified ester is prepared it is desirable to process the ester by adding aqueous acid to the reaction mass and the neutralizing agent is conveniently added to the mass with this aqueous acid. The ester is then precipitated and the combined sulfuric acid in the final ester is held to a value within the range of .02-.001%. If hydrolysis is desired, the greater portion of the catalyst which is present is neutralized and the hydrolysis is carried out but the combined sulfuric acid in the final ester is thereby held to a sulfur content of .02-.001%.

In carrying out the hydrolysis of the cellulose ester the water in the form of aqueous acid which is added to the mass should be added at such a rate that it is uniformly worked into the hydrolysis mixture. Also, the addition and the hydrolysis should be at a temperature within the range of 110-180° F. After the ester has been hydrolyzed to the desired extent which is ordinarily to impart .05-.5 hydroxyls per $C_6$ celluose units the ester is precipitated by the addition of aqueous acid to recover the ester. The ester is then given a thorough washing in water, preferably several washes with water having a low mineral content, such as less than 20 p. p. m., such as distilled water or Permutit-treated water.

In the last wash or as a separate addition after the last wash and before drying or as an addition to the compounding mixer the stabilizing formate may be added in the form of its aqueous solution.

The cellulose esters in accordance with our invention are useful for any of the well-known uses for cellulose esters but are particularly useful for plastic or melt-coating compositions where high temperatures are employed. For plastic compositions of cellulose acetate butyrate having high butyryl contents it is ordinarily desirable to incorporate 5-20% of plasticizer and with melt-coating compositions up to 50% of plasticizer may be employed. In the case of cellulose acetate ordinarily 25-40 parts of plasticizer are employed per 100 parts of cellulose ester to make plastic compositions, which proportions are useful in using the esters stabilized in accordance with our invention.

We claim:

1. A lower fatty acid ester of cellulose having a combined sulfur content of .02-.001% to which has been added .01-.5% of a stabilizer selected from the group consisting of the formates of aluminum, barium, and magnesium.

2. A cellulose acetate butyrate having a combined sulfur content of .02-.001% to which has been added .01-.5% of a stabilizer selected from the group consisting of the formates of aluminum, barium, and magnesium.

3. Cellulose acetate having a combined sulfur content of .02-.001% to which has been added .01-.5% of a stabilizer selected from the group consisting of the formates of aluminum, barium, and magnesium.

4. A lower fatty acid ester of cellulose having a combined sulfur content of .02-.001% to which has been added .01-.5% of an aluminum formate.

5. A lower fatty acid ester of cellulose having a combined sulfur content of .02-.001% to which has been added .01-.2% of an aluminum formate.

6. A lower fatty acid ester of cellulose having a combined sulfur content of .02-.001% to which has been added .01-.5% of normal aluminum formate.

7. A lower fatty acid ester of cellulose having a combined sulfur content of .02-.001% to which has been added .01-.5% of barium formate.

8. A lower fatty acid ester of cellulose having a combined sulfur content of .02-.001% to which has been added .01-.5% of magnesium formate.

9. A lower fatty acid ester of cellulose having a combined sulfur content of .02-.001% to which has been added .01-.5% of basic aluminum formate.

10. A cellulose acetate butyrate having a combined sulfur content of .02-.001% to which has been added .01-.2% of normal aluminum formate.

11. A plastic composition comprising a lower fatty acid ester of cellulose having a combined sulfur content of .02-.001%, a plasticizer therefor and .01-.5%, based on the cellulose ester, of a stabilizer selected from the group consisting of the formates of aluminum, barium, and magnesium.

GORDON D. HIATT.
ROBERT F. WILLIAMS.

REFERENCES CITED

The following references are of record in the file of this patent:

UNITED STATES PATENTS

| Number | Name | Date |
|---|---|---|
| 1,607,474 | Mork | Nov. 16, 1926 |
| 2,025,939 | Dreyfus | Dec. 31, 1935 |
| 2,186,454 | Gloor | Jan. 9, 1940 |
| 2,203,749 | Seymour et al. | June 11, 1940 |
| 2,329,705 | Dreyfus | Sept. 21, 1943 |